United States Patent [19]

Politte

[11] Patent Number: 4,974,695
[45] Date of Patent: Dec. 4, 1990

[54] REVERSE DRIVE MECHANISM FOR A MOTORCYCLE

[76] Inventor: Emmett L. Politte, Rt. #13, Box 1001, Columbia, Mo. 65201

[21] Appl. No.: 360,783

[22] Filed: Jun. 2, 1989

Related U.S. Application Data

[63] Continuation of Ser. No. 74,774, Jul. 17, 1987, abandoned.

[51] Int. Cl.$^5$ ............................................. B62D 61/02
[52] U.S. Cl. .................................... 180/221; 180/65.3
[58] Field of Search ................. 280/210, 212; 180/15, 180/16, 219, 221, 65.1, 65.2, 65.5

[56] References Cited

U.S. PATENT DOCUMENTS

| | | | |
|---|---|---|---|
| 2,578,886 | 12/1951 | Isherwood et al. | 180/33 |
| 2,695,486 | 11/1954 | Hospe | 56/26 |
| 2,751,028 | 6/1956 | Laughlin | 180/19 |
| 2,897,645 | 8/1959 | Veillette | 56/25.4 |
| 3,225,854 | 12/1965 | Goerner | 180/33 |
| 4,516,647 | 5/1985 | Novak | 280/212 |
| 4,763,538 | 8/1988 | Fujita et al. | 180/65.2 |

*Primary Examiner*—Charles A. Marmor
*Assistant Examiner*—Richard Camby
*Attorney, Agent, or Firm*—Shoemaker and Mattare, Ltd.

[57] ABSTRACT

A reverse drive mechanism for attachment to a motorcycle having two wheels, an engine and transmission for driving same in conventional fashion. The reverse drive mechanism has an electric motor which is separately energized and will, through slip coupling friction structure, drive a friction drive wheel engaged with the tire on the rear wheel of the motorcycle. Appropriate energizing and limit switches are associated with this reverse drive mechanism for safety and ease of use thereof.

18 Claims, 4 Drawing Sheets

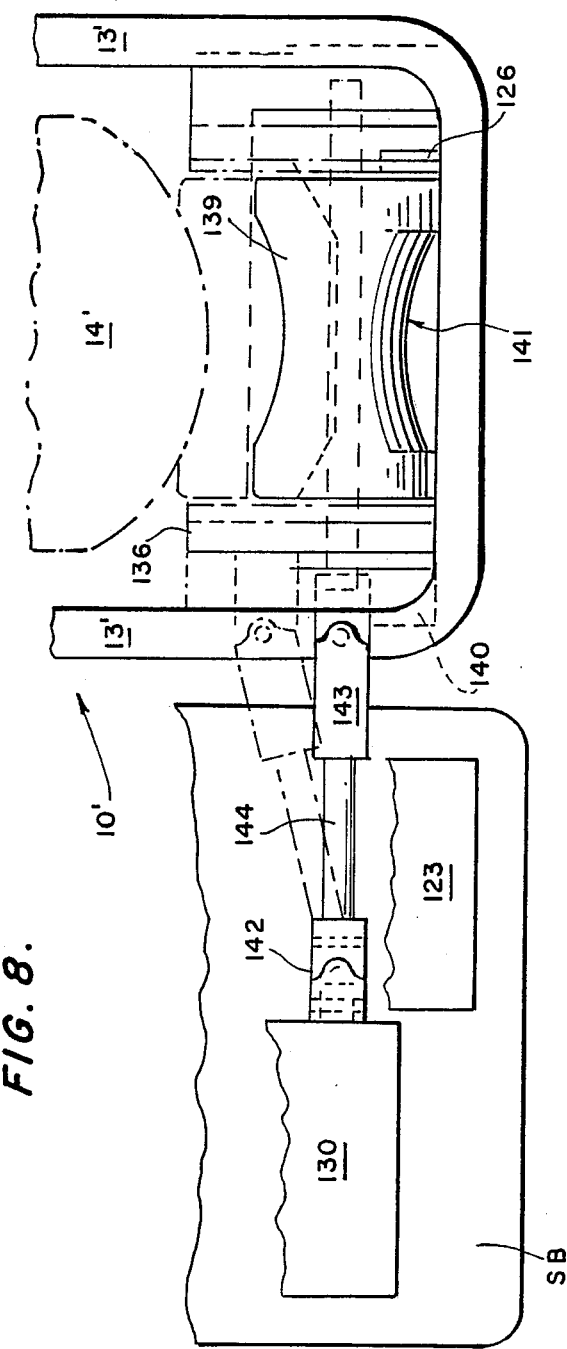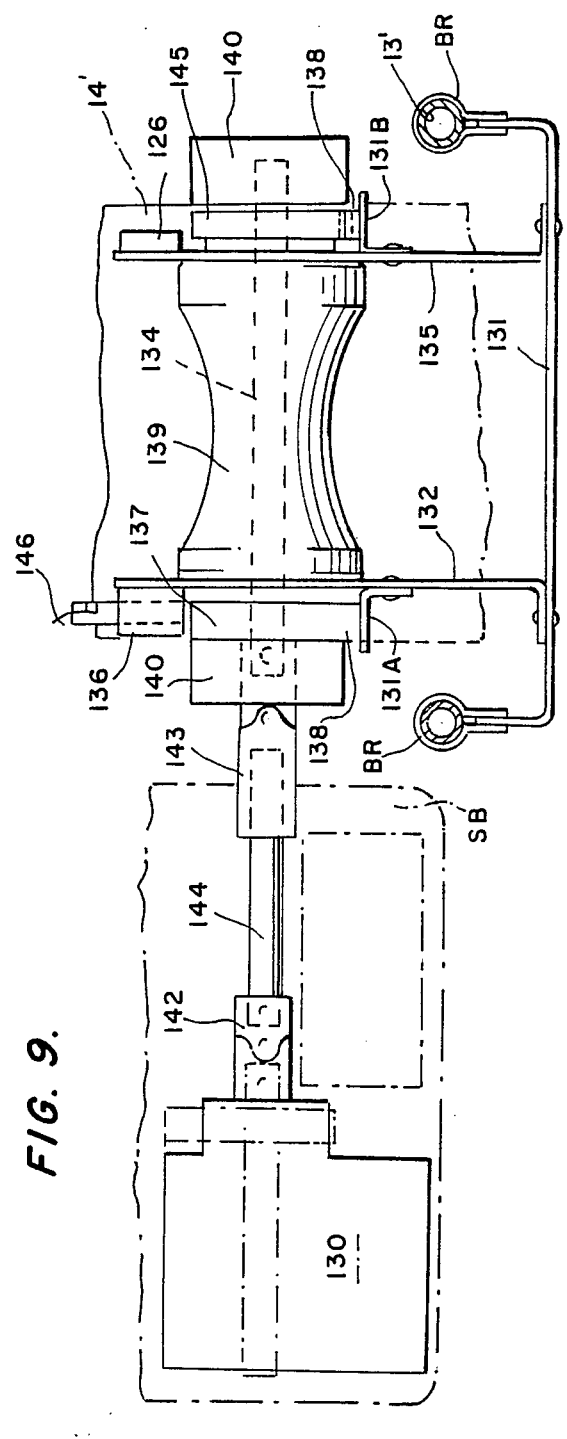

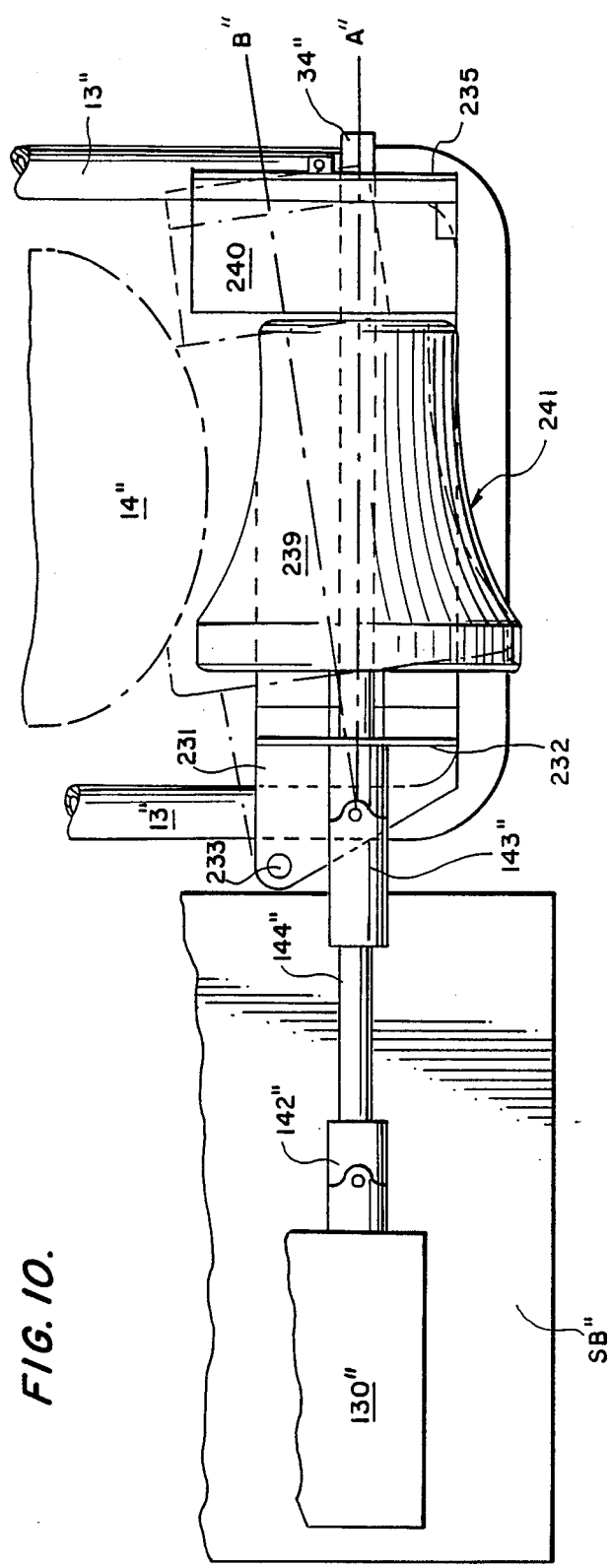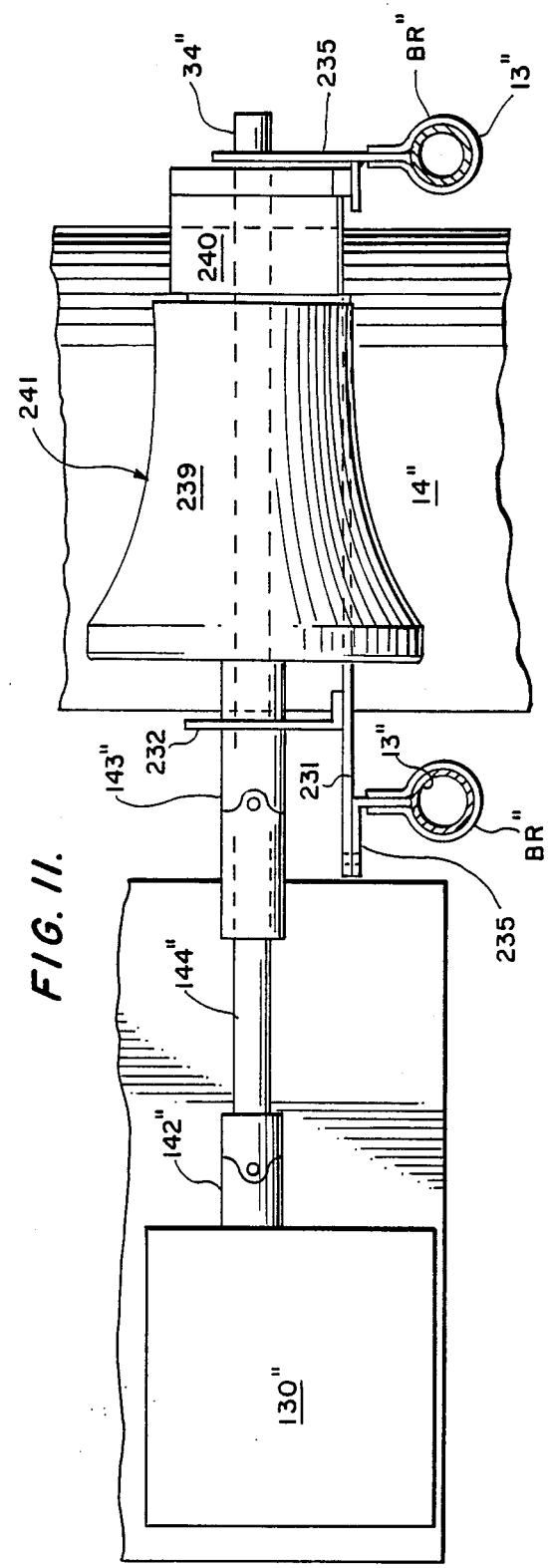

REVERSE DRIVE MECHANISM FOR A MOTORCYCLE

This is a continuation, now abandoned of application Ser. No. 07/074,774 filed July 17, 1987.

BACKGROUND OF THE INVENTION

1. Field of the Invention

This invention relates in general to a mechanism for use with motorcycles for driving them in reverse without the use of the motorcycle engine or transmission structure.

2. Description of the Prior Art

Reverse friction drives for riding lawnmowers and the like have been devised; however, such arrangements are not common for use with motorcycles. Drive arrangements for propelling mowers and the like in a forward direction, are fairly common; however, the use for driving a motorcycle backwards is not conventional.

Existing prior patents which may be pertinent to the present invention are as follows:

3,225,854—12/28/65—Goerner
2,897,645—8/ 4/59—Veillette
2,751,028—6/19/56—Laughlin
2,695,486—11/30/54—Hospe
2,578,886—12/18/51—Isherwood, et al The Goerner patent shows an engine drive arrangement for use with a bicycle, but only propels same in a forward direction and is only the motor drive therefor, and not a supplement to an existing motor arrangement of a motorcycle. A friction drive to the rear wheel of the bicycle is employed.

The Isherwood, et al patent similarly shows the use of an engine friction drive for a bicycle, but again, is for forward drive only.

The Hospe patent, as well as the Laughlin patent, provide for a reverse direction, but are utilized as lawnmower propellants, rather than for use with a motorcycle.

The Veillette patent shows a reversible friction drive for a lawnmower.

None of the known prior art devices offer the new and novel features of the present invention.

SUMMARY OF THE INVENTION

An object of the present invention is to provide a mechanism for use with a conventional type motorcycle which will allow same to be reversed and moved backwards without employing the existing motorcycle engine and/or transmission drive train.

Another object of the present invention is to provide an easily mounted friction drive structure for moving a motorcycle backwards without even starting the existing motorcycle engine.

A further object of this invention is to provide an easily mountable/dismountable pivot structure for supporting a D.C. motor having a friction slip coupling for driving the rear tire of a motorcycle to back same up when desired.

A further object of this invention is to provide a saddle bag structure for supporting a D.C. motor having a universal joint drive to double friction slip couplings to a shaped friction drive wheel for driving the rear tire of a motorcycle to back same up when desired.

Another further object of this invention is to provide a saddle bag structure for supporting a D.C. motor having a universal joint drive to a single friction slip coupling for a shaped friction drive wheel for driving the rear tire of a motorcycle to back same up when desired.

A still further object of the present invention is for motorcycle attachments for reversing the motorcycle without employing the existing motorcycle drive train structure.

The present invention has a number of new and novel features. Among them is the use of a 12 volt D.C. motor which through suitable friction slip clutches and friction drives will be engageable with the rear wheel or tire of a motorcycle, which will permit the motorcycle to be backed up without using the existing motorcycle engine and/or transmission. The respective friction drive structures of this invention will move forward or backward by means of a gear on a gear track until the drive friction drive wheel comes into contact with the rear tire of the motorcycle. This will provide a friction drive to this wheel in order to move the motorcycle rearwardly at approximately 30 feet per minute. After the backing of the motorcycle has been completed, a rocker switch is actuated and the drive unit will move away from the rear tire of the motorcycle until it comes into contact with an electrical limit stop. This limit stop will de-energize a light on the motorcycle panel which indicates that the motorcycle is ready to be used in a forward direction using the original motorcycle engine and transmission structure. Preferably, the electrical two-way actuating switch and limit structure will function only when the motorcycle transmission is in the neutral position, for obvious safety reasons.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 8 is a top plan view of another embodiment of the invention.

FIG. 9 is an elevational view from the rear of the FIG. 8 embodiment.

FIG. 10 is a top plan view of a further embodiment of the invention.

FIG. 11 is an elevational view from the rear of the FIG. 10 embodiment.

DESCRIPTION OF THE PREFERRED EMBODIMENT

Figure 1:
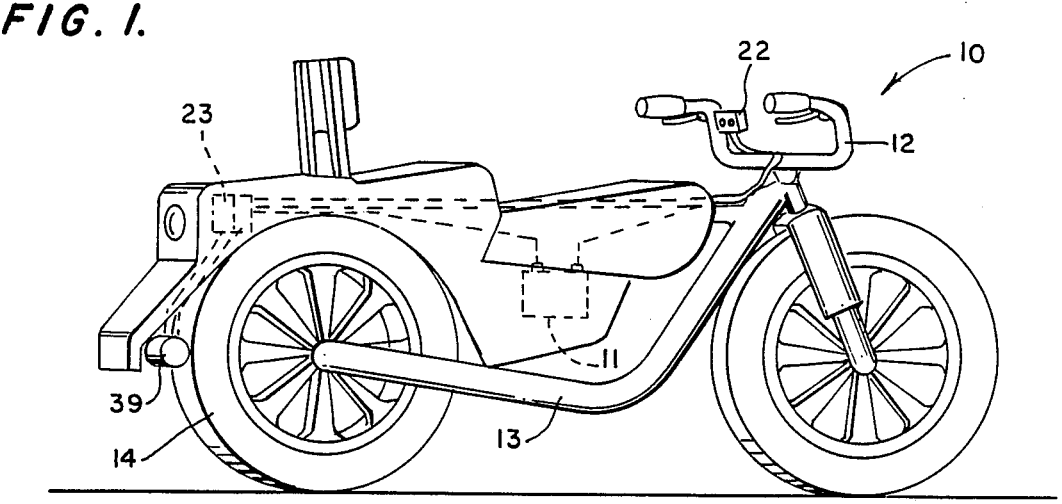
FIG. 1 is a perspective view of the device of the present invention as installed on a conventional type motorcycle and as in use therewith.
Figure 2:
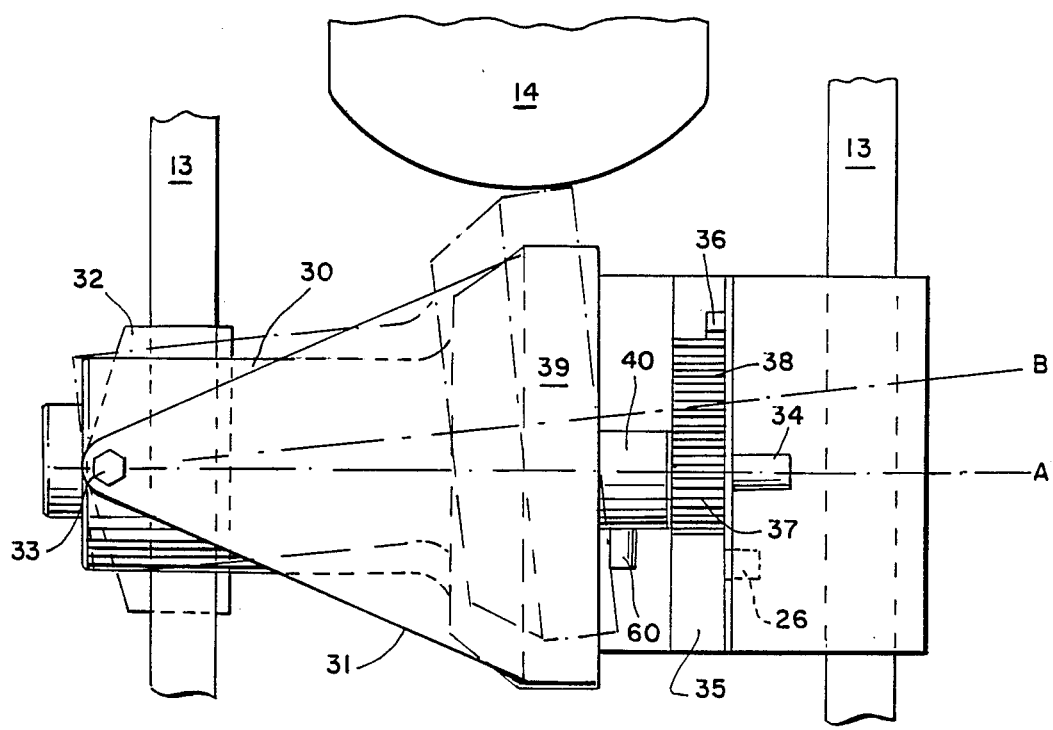
FIG. 2 is a top plan view of the component elements of the reverse drive mechanism of a first embodiment of the present invention.
Figure 3:
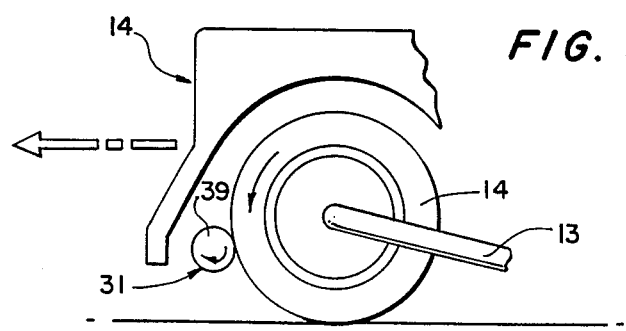
FIG. 3 is a side elevational view, primarily in schematic form, showing the operation of the present invention with a rear wheel of a motorcycle.
Figure 4:
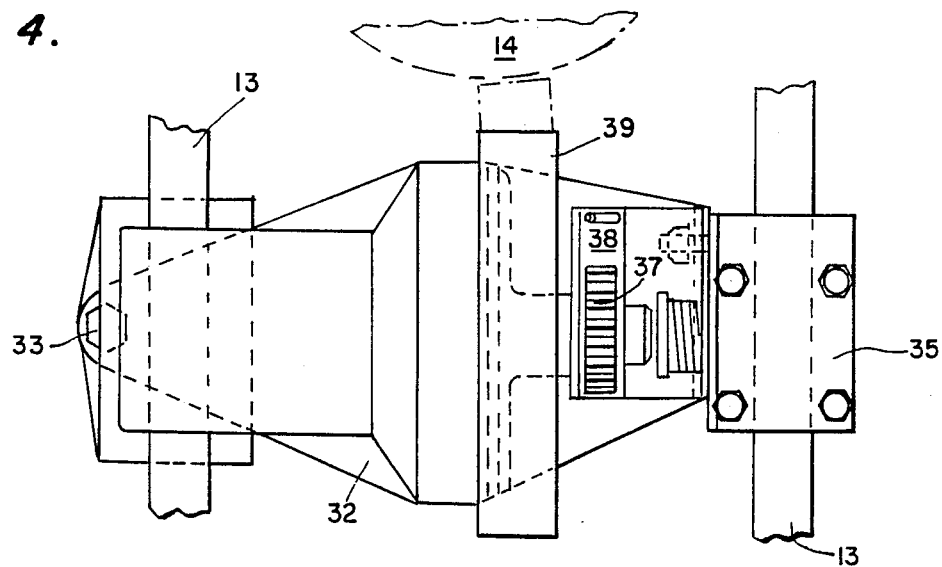
FIG. 4 is a top plan view of a modified arrangement of the first embodiment, including mounting brackets.

Referring to FIG. 1 of the drawing, reference numeral 10 indicates in general the present invention as mounted upon the frame of a motorcycle. As best seen in FIG. 2, the mechanism includes a 12 volt electric D.C. drive motor 30 which is mounted upon a pivotal base plate 31 so that same may be attached and pivoted from a bracket 32 attached to the frame 13 of the motorcycle. A pivot point bolt 33 permits the drive shaft 34 of the motor 30 to have the axis centerline aligned along line A or B of FIG. 2. When the drive motor 30 has been pivoted so that the drive shaft 34 is in the plane of centerline B, the friction drive wheel 39 is firmly engaged with the rear tire 14 of the motorcycle. Preferably, a slip coupling or, clutch 40 is provided between the friction drive wheel 39 and the drive shaft 34 of the motor. Any conventional type frictional slip clutch may be used for this coupling. Also, a gear 37 in conjunction with a gear track 38 is provided with the motor drive for effecting a pivotal movement of the motor 30 about pivot point 33. This is effected by suitable energization of a master rocker switch 20 with a control box affixed to the motorcycle handlebars which will switch electric power from the motorcycle battery 11 to an electric solenoid assembly 23 for the drive motor 30. Thus, the motor will operate when switch 20 is suitably turned on.

By energization of rocker switch 20, the motor shaft 34 will rotate to drive the gear 37 so that same will move along gear track 38 to effect the friction engagement of drive wheel 39 with the tire 14.

Also in conjunction with the foregoing is a slot S and a warning light switch 26 which will indicate when the reverse drive of the present invention has the friction drive wheel 39 in engagement with the tire 14. A suitable warning light 21 is provided on the motorcycle bracket 22 so that the operator of the motorcycle can always be fully informed as to when engagement of this adapter unit has occurred.

Preferably, there is also a limit switch attached to the transmission of the motorcycle so that the drive motor 30 will not be permitted to be energized unless the transmission of the motorcycle is in the neutral position. This is, obviously, a safety feature to prevent attempting to back up a motorcycle by the use of this reverse drive mechanism when the motorcycle transmission is in any gear.

Electrical rocker switch 20 is an "on-off-on" self-cancelling circuit control switch. Switch,20, warning light 21, and cable 46 are mounted in a control box 22 on the handlebars 12, or other convenient location for the operator. Three electrical wires connect switch 20 with solenoid box 23 that houses two solenoids 24, 25 that are designed to operate motor 30 in a forward or reverse motion as controlled by switch 20. Solenoids 24 and 25 will be connected to motorcycle battery 11 to transmit high amps to operate motor 30 with the gauge of the wires sufficient to carry the high amps load.

Figure 5:
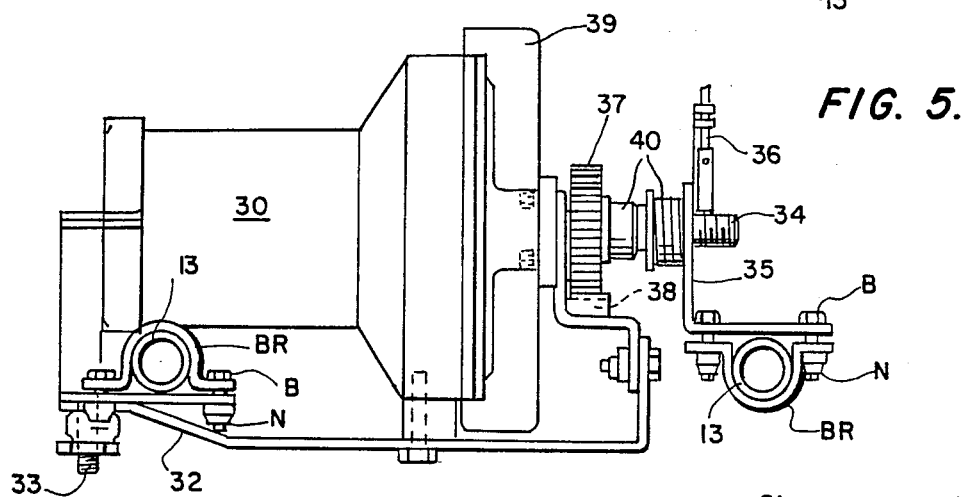
FIG. 5 is an elevational view from the rear of the FIG. 4 structure.
Figure 6:
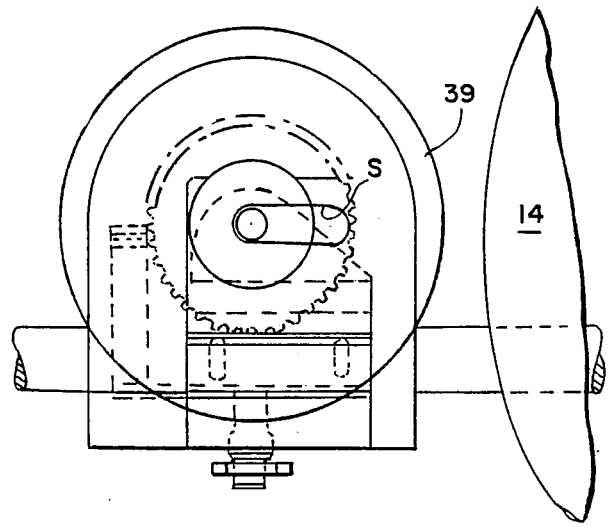
FIG. 6 is an end view of the structure of FIG. 4 looking to the left.
Figure 7:
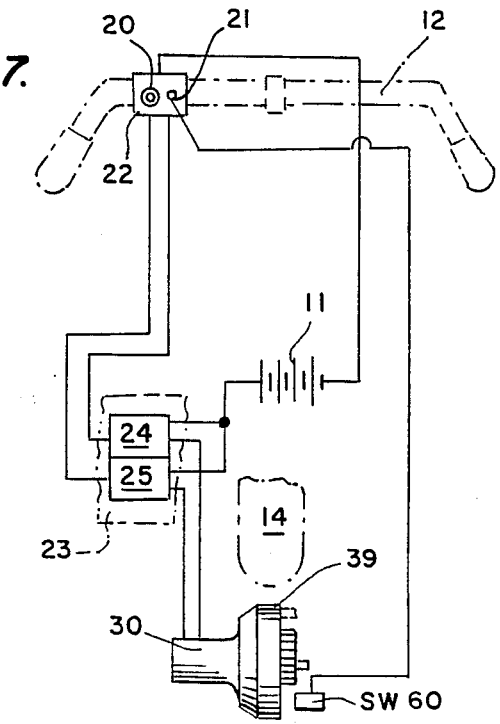
FIG. 7 is an electric hook-up schematic.

When an operator desires to reverse the direction of motorcycle 10, first he must release a safety lock pin 36 to permit shaft 34 to move when switch 20 is placed in the reverse mode. To activate switch 20, the transmission of the motorcycle 10 must be in neutral with the ignition switch in the "on" position. Safety lock 36 and warning light switch 60 are mounted on mounting brackets 32 and 35 (see FIG. 5).

When switch 20 is in the reverse mode, it will supply low amp D.C. current to solenoid 24 or 25 to provide the needed high amps to operate motor 30 from battery 11.

Motor 30 receives the command to operate the motorcycle 10 in a backward direction. Shaft 34 rotates clockwise, which rotates gear wheel 37 that travels on gear track 38 in a forward direction guided by slotted openings s in bracket 35, and motor 30 centerline rotates at pivot point 33 until drive wheel 39 comes into contact with tire 14 at the desired P.S.I. per the slip clutch or torque tender mechanism 40. At this position gear wheel 37 will stop turning due to release of clutch 40, permitting shaft 34 to continue to rotate and operate drive wheel 39. Drive wheel 39 rotating in a clockwise motion and in contact with motorcycle tire 14 will rotate the rear wheel in a counterclockwise motion, causing the motorcycle 10 to move in a backward motion as controlled by the operator using switch 20.

When the operator has moved the motorcycle 10 to his desired location and wishes to stop the reverse drive, he will move switch 20 to the retract mode, and solenoids 24–25 will reverse motor 30 in a counterclockwise motion and slip clutch 40 will lock up with gear wheel 37 and move drive wheel 39 away from motorcycle tire 14 on gear tract 38 until shaft 34 comes to its end of travel by means of slotted openings in bracket 35. At this time clutch 40 will release gear wheel 37 from turning and limit switch 60 will open the electrical circuit so that warning light 21 will be turned off. The operator will release rocker switch 20 which then will return to the off or neutral mode, which will de-energize the electric supply for operating motor 30.

The operator will then lock safety pin 36 after the motorcycle 10 has completed the desired reverse operation. It is now ready to operate in the forward direction by means of the motorcycle's motor and drive system as designed by the motorcycle manufacturer.

The present invention offers the operator of a motorcycle the convenience of being able to back up under power and does not require use of any existing engine and/or transmission structure of the motorcycle. Of course, most motorcycles do not have a reverse gear, since it would be practically impossible to balance and guide same in reverse. This adapter unit does offer a lot more convenience and ease of operability to existing conventional type motorcycles than previously.

Looking at FIGS. 8 and 9, the second embodiment of the present invention will now be described in detail. A D.C. electric motor 130 is suitably enclosed and mounted in a saddlebag SB which can be attached to the rear frame of a motorcycle 10'. Mounting clamp brackets BR are suitably affixed to frame members 13' of the motorcycle. Brackets 132 and 135 are mounted upon a base plate 131 which in turn suitably support rotatably thereon a tire friction drive wheel 139. This drive wheel 139 is concave shaped in cross-section for mating engagement with a motorcycle tire 14', and is specifically designed to engage as large an area of the tire as possible. Note contact engagement as depicted in dotted lines in FIG. 8.

A drive shaft 134 is driven from the D.C. motor output shaft through suitable universal joints 142 and 143, and a drive coupling shaft 144 therebetween. Preferably, dual friction slip clutches 140 are provided at both ends of the driven shaft 134 for the purpose of friction coupling the output from motor 130 to the tire friction drive wheel 139. Suitable switches 126, as well as lock pin 136, are provided and operate in the same manner as already described for elements 60, 36 and 46 of the first embodiment. A gear track 138 mounted upon a support bracket 131B is mounted for engagement with the gear pinion 137 and 145.

As can be easily visualized, when the rocker switch 20 on control box 22, mounted on the motorcycle handlebars, is momentarily depressed, the timing relay 24 is suitably energized for in turn energizing the electric motor 130. Again, upon clockwise rotation of the output shaft of motor 130, pinion gears 137 and 145 will effect sliding movement of the driven shaft 134 together with tire friction drive wheel 139 so that the drive structure will move from the solid line position, shown in FIG. 8 to the dotted line tire engaging position shown in this same figure. The rest of the operation of this embodiment is similar to that of the first embodiment already described in detail.

FIGS. 10 and 11 show another further embodiment of the present invention. A D.C. electric motor 130″ is supported on saddlebags SB″ and coupled to a universal joint 142″, drive shaft 144″ and second universal joint 143″ to drive a single slip clutch 240. Frame attachment brackets BR″ support a pair of end plates 235 from the frame 13″ for supporting a pivot plate 231 thereon. A pivot point 233 permits the pivot plate 231 to rotate so that the tire friction drive wheel 239 can engage and disengage with the motorcycle rear tire 14″. The centerlines A″ and B″ depicted in FIG. 10 show the disengaged and engaged positions of this drive structure. The drive wheel 239 is a portion of a concave cylinder in cross-section as depicted in these two figures. This type, for some types of tires, provides better friction engagement than the drive wheels of the previous embodiments. Operating structure, switches, etc. similar to those already described can be employed with this embodiment, though not shown in these figures for purposes of clarity.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A reverse drive unit for a motorcycle, comprising:
    mounting means for attachment to a motorcycle frame, said mounting means comprising a saddle bag;
    a drive motor supported in said saddle bag mounting means;
    a friction drive wheel;
    universal joints and slip clutch means connected between said drive motor and said friction drive wheel for drivingly coupling same; and
    interengaged gear drive and track means to move said friction drive wheel into engagement with a tire of said motorcycle.

2. An adapter unit for attachment to a motorcycle or the like having a battery and a rear wheel, for permitting the motorcycle to be moved in a backward or reverse direction without energization of an existing conventional power drive structure for the motorcycle, comprising:
    a saddle bag mount for attachment to the motorcycle for holding an electric motor;
    an electric motor supported in said saddle bag mount;
    a slidable friction drive wheel structure attachable to said motorcycle so it can be selectively moved into and out of drive engagement with the rear wheel of said motorcycle;
    energization means for energizing said electric motor from the motorcycle battery;
    universal joint means connected between the motor output and the friction drive wheel; and
    slip coupling means between the output of said electric motor and the friction drive wheel in order to move the motorcycle in a backward direction when an operator so desires.

3. The reverse drive unit of claim 1, wherein said motor is a direct current electric motor.

4. The adapter unit of claim 2, wherein said friction drive wheel is shaped for maximum tire engagement.

5. In a motorcycle having a frame, a battery, a driven wheel, a motive power means to start and operate the motorcycle in a forward direction, and a primary drive means connected between the motive power means and the driven wheel for effecting forward motion of the motorcycle, the improvement comprising:
    mounting means for attachment to the motorcycle frame;
    an auxiliary drive means separate and independent from said primary drive means and carried by said mounting means for selective coupling with said driven wheel to cause said driven wheel to move in a reverse direction for reverse movement of the motorcycle; and
    auxiliary motive power means separate and independent from that used to start and operate the motorcycle in a forward direction, said auxiliary motive power means carried by said mounting means and connected to said auxiliary drive means to operate said auxiliary drive means to cause the motorcycle to move in said reverse direction.

6. A motorcycle as claimed in claim 5, wherein:
    said auxiliary drive means includes a friction drive wheel movable into and out of engagement with said motorcycle driven wheel for selectively operating said driven wheel in said reverse direction.

7. A motorcycle as claimed in claim 6, wherein:
    said mounting means includes structure for pivotally mounting the friction drive wheel from said motorcycle frame.

8. A motorcycle as claimed in claim 7, wherein:
    an interengaged gear drive and track are connected between the motorcycle frame and the friction drive wheel for moving the friction drive wheel toward and away from the motorcycle driven wheel.

9. A motorcycle as claimed in claim 8, wherein:
    a slip clutch means is connected between said auxiliary motive power means and the friction drive wheel for drivingly coupling and uncoupling same.

10. A motorcycle as claimed in claim 9, wherein:
    said auxiliary motive power means comprises an electric motor.

11. A motorcycle as claimed in claim 6, wherein:
    an interengaged gear drive and track are connected between the motorcycle frame and the friction drive wheel for moving the friction drive wheel toward and away from the motorcycle driven wheel.

12. A motorcycle as claimed in claim 11, wherein:

a slip clutch means is connected between said auxiliary motive power means and the friction drive wheel for drivingly coupling and uncoupling same.

13. A motorcycle as claimed in claim 5, wherein:
said auxiliary motive power means comprises an electric motor.

14. A motorcycle as claimed in claim 5, wherein:
said auxiliary motive power means comprises an electric motor; and
switch means are carried on said motorcycle for connecting the motor with the battery of the motorcycle for selectively energizing and deenergizing the motor for operation of the motorcycle in a reverse direction.

15. A motorcycle as claimed in claim 5, wherein:
warning means is connected with said auxiliary drive means for indicating when same is operatively coupled with said motorcycle driven wheel.

16. A motorcycle as claimed in claim 7, wherein:
an interengaged gear drive and track are connected between the motorcycle frame and the friction drive wheel for moving the friction drive wheel toward and away from the motorcycle driven wheel, said gear drive and track being operated when said auxiliary motive power means is operated.

17. A motorcycle as claimed in claim 16, wherein:
a slip clutch means is connected between said auxiliary motive power means and the interengaged gear drive and track to interrupt operation of said gear drive and track when the friction drive wheel is in engagement with said motorcycle driven wheel.

18. A motorcycle as claimed in claim 6, wherein:
safety lock-out means is operatively associated with said auxiliarly drive means to prevent its accidental engagement with the motorcycle driven wheel.

* * * * *